(12) United States Patent
Ishida (10) Patent No.: US 9,120,472 B2
(45) Date of Patent: Sep. 1, 2015

(54) BRAKING DEVICE

(71) Applicant: ADVICS CO., LTD., Kariya-shi (JP)

(72) Inventor: Satoshi Ishida, Chiryu (JP)

(73) Assignee: ADVICS CO., LTD., Kariya-Shi, Aichi-Ken (JP)

(*) Notice: Subject to any disclaimer, the term of this patent is extended or adjusted under 35 U.S.C. 154(b) by 174 days.

(21) Appl. No.: 13/724,197

(22) Filed: Dec. 21, 2012

(65) Prior Publication Data

US 2013/0162012 A1    Jun. 27, 2013

(30) Foreign Application Priority Data

Dec. 21, 2011    (JP) .................................. 2011-280073

(51) Int. Cl.
*B60T 13/14*    (2006.01)
*B60T 8/40*    (2006.01)

(52) U.S. Cl.
CPC ............. *B60T 13/142* (2013.01); *B60T 8/4077* (2013.01)

(58) Field of Classification Search
CPC ................ B60T 8/4077; B60T 13/142; B60T 13/145–13/146
See application file for complete search history.

(56) References Cited

U.S. PATENT DOCUMENTS

2002/0140283 A1    10/2002    Kusano et al.
2011/0108377 A1*   5/2011     Bae et al. ...................... 188/152

FOREIGN PATENT DOCUMENTS

| DE | 102011085986 A1 * | 7/2012 |
| EP | 1975023 A2 * | 10/2008 |
| JP | 2002-264795 A | 9/2002 |
| JP | 2007-055588 A | 3/2007 |

* cited by examiner

*Primary Examiner* — Anna Momper
(74) *Attorney, Agent, or Firm* — Buchanan Ingersoll & Rooney PC (57) ABSTRACT

A braking device comprises: a master cylinder; an electrical pressure adjusting unit; a reaction force generating unit, which forms a reaction force chamber and which generate a reaction hydraulic pressure in the reaction force chamber; a reservoir for brake fluid; an inter-chamber brake fluid path; a reservoir path that connects the reservoir and the inter-chamber brake fluid path; and a normally-closed control valve, wherein the electrical pressure adjusting unit includes an electrical pump which is directly connected with the driving hydraulic pressure chamber to supply the brake fluid to the driving hydraulic pressure chamber, and wherein at least one of electromagnetic valves provided in the electrical pressure adjusting unit and the reaction force generating unit is a normally-opened electromagnetic valve, which is provided in the inter-chamber brake fluid path and is configured to communicate the inter-chamber brake fluid path in a non-conduction state.

4 Claims, 3 Drawing Sheets

BRAKING DEVICE

CROSS-REFERENCE TO RELATED APPLICATION

This application claims priority from Japanese Patent Application No. 2011-280073 filed on Dec. 21, 2011, the entire subject matter of which is incorporated herein by reference.

TECHNICAL FIELD

This disclosure relates to a braking device capable of performing a regenerative cooperative control, in which cooperation is performed between a service brake and a regenerative brake.

BACKGROUND

Currently, in order to recover energy generated in braking as regenerative energy, a regenerative cooperative control is performed. The regenerative cooperative control generates a regenerative brake, instead of a service brake, when a brake pedal is depressed by a driver. When the regenerative cooperative control is performed, an input piston is moved by the depression of the brake pedal. At this time, if the input piston contact with an output piston (master cylinder (hereinafter, referred to as M/C) piston provided in M/C) to generate M/C pressure, a braking force of the service brake is generated, so that a regenerative efficiency is to be decreased.

In view of the above, JP-A-2007-55588 proposes a braking device for a vehicle, in which a clearance expecting a stroke amount corresponding to a brake amount of the regenerative brake is provided between the input piston and the output piston. Since the clearance is provided between the input piston and the output piston, the input piston does not contact with the output piston until the maximum regenerative brake to be generated is generated while the regenerative cooperation, so that it is possible to achieve the maximum regenerative efficiency.

However, in power source failure in which an electrical system (e.g., brake ECU) is out of order, the output piston is required to be directly pressed to generate the braking force, and thus the clearance between the input piston and the output piston becomes an ineffective stroke. Accordingly, it causes a response delay at the time of brake operation, and the brake fluid to be output from the M/C to a wheel cylinder (hereinafter, referred to as W/C) may be not sufficient in accordance with a size of the clearance.

SUMMARY

This disclosure provides at least a braking device capable of eliminating an ineffective or an idle stroke while ensuring a regenerative efficiency.

In view of the above, a braking device of this disclosure comprises: a master cylinder, which forms a driving hydraulic pressure chamber, in which a brake fluid is supplied to or discharged from the driving hydraulic pressure chamber to drive a master piston; an electrical pressure adjusting unit, which adjusts hydraulic pressure of the driving hydraulic pressure chamber by supplying the brake fluid to the driving hydraulic pressure chamber or discharging the brake fluid from the driving hydraulic pressure chamber; a reaction force generating unit, which forms a reaction force chamber that is compressed or expanded in accordance with operations of a brake operating member, and which generate a reaction hydraulic pressure in the reaction force chamber in accordance with an operation amount of the brake operating member; a reservoir for brake fluid; an inter-chamber brake fluid path that connects the reaction force chamber and the driving hydraulic pressure chamber; a reservoir path that connects the reservoir and the inter-chamber brake fluid path; and a normally-closed control valve, which is provided in the reservoir path, wherein the electrical pressure adjusting unit includes an electrical pump which is directly connected with the driving hydraulic pressure chamber to supply the brake fluid to the driving hydraulic pressure chamber, and wherein at least one of electromagnetic valves provided in the electrical pressure adjusting unit and the reaction force generating unit is a normally-opened electromagnetic valve, which is provided in the inter-chamber brake fluid path and is configured to communicate the inter-chamber brake fluid path in a non-conduction state.

According to the above braking device, when a regenerative cooperative control is performed at a normal time, the electromagnetic valves and the valve units controls the reaction hydraulic pressure to be generated in the driving hydraulic pressure chamber and controls the reaction hydraulic pressure to be generated in the reaction force chamber is generated. Therefore, it is possible to obtain the maximum regenerative efficiency to not generate the M/C pressure until the maximum regenerative brake is generated. Also, at the time of the power supply failure, since the inter-chamber brake fluid path is in the communication state by the electromagnetic valves, the brake fluid of the reaction force chamber flows to the driving hydraulic pressure chamber via the inter-chamber brake fluid path, so that the braking force is to be generated in accordance with the operation amount of the brake operating member, without having the ineffective stroke. Accordingly, it is possible to prevent ineffective input at the time of the power supply failure, while ensuring the regenerative efficiency.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, illustrative embodiments of this disclosure will be described with reference to the accompanying drawings. It should be noted that portions or components common to each illustrative embodiment will be given the same reference numerals or the legends.

Illustrative Embodiment 1

Figure 1:
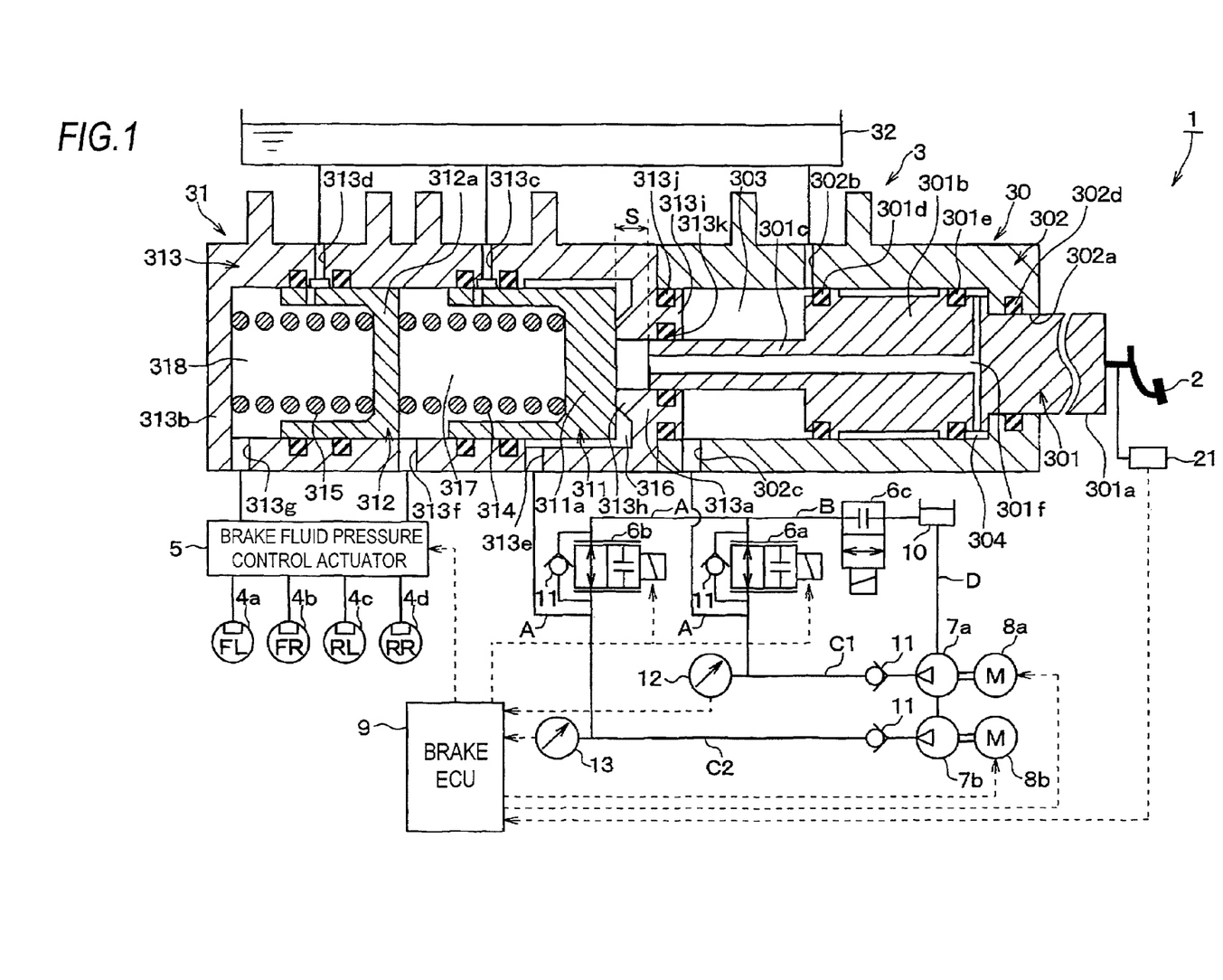
FIG. 1 is a schematic circuit diagram illustrating the whole configuration of a braking device for a vehicle according to a first illustrative embodiment of this disclosure.

The first illustrative embodiment of this disclosure will be described below. FIG. 1 illustrates the whole configuration of a braking device 1 for a vehicle according to the first illustrative embodiment of this disclosure. The braking device 1 of this illustrative embodiment will be described with reference to FIG. 1.

As illustrated in FIG. 1, the braking device 1 includes a brake pedal 2, an M/C 3, W/Cs 4a to 4d, a brake fluid pressure control actuator 5, first to third control valves 6a to 6c configuring a valve unit, a first pump 7a and a second pumps 7b, a first motor 8a and a second motor 8b, and a brake ECU 9, etc.

The brake pedal 2 presses an input piston 301 provided in the M/C 3 in response to the depression by a driver. An operation amount of the brake pedal 2 is detected by an operation amount sensor 21. The operation amount sensor 21 includes, for example, a stroke sensor and a stepping force sensor. A detected signal of the operation amount sensor 21 is sent to the brake ECU 9, so that the brake ECU 9 obtains an operation amount of the brake pedal 2. In addition, the brake pedal 2 is exemplified as a brake operating member herein, but a brake lever or the like may be applied.

The M/C 3 is configured by an input part 30, an output part 31, and a master reservoir 32. The input part 30 is provided with an input piston 301, which is moved in response to the depression of the brake pedal 2, and the output part 31 is provided with M/C pistons 311 and 312 corresponding to an output piston, which is moved when a service brake is operated.

The input part 30 has an input piston 301 urging in response to the depression of the brake pedal 2 and a cylinder portion 302, in which a space accommodate a brake fluid and the input piston 301 is slid.

The input piston 301 has a pressure receiving portion 301a, a sliding portion 301b, and a pressing portion 301c. The pressure receiving portion 301a is a portion to which the depression of the brake pedal 2 is input, and is inserted into an opening 302a provided in one end of the cylinder portion 302. The sliding portion 301b has a diameter lager than that of the pressure receiving portion 301a, and equal to or slightly smaller than an inner diameter of the cylinder portion 302. An outer circumferential surface of the sliding portion 301b is provided with seal members 301d and 301e which are made of an O-ring or the like, thereby sealing between the sliding portion 301b and the cylinder portion 302. The pressing portion 301c has a diameter smaller than that of the sliding portion 301b, and is configured to axially protrude from the sliding portion 301b to the output part 31. A front end of the pressing portion 301c is disposed to be spaced apart from the M/C piston 311 by a gap S.

The inner portion of the pressing portion 301c and the sliding portion 301b is provided with a communication path 301f which is connected from the front end of the pressing portion 301c to the brake pedal 2 than the seal member 301e provided on the outer circumferential surface of the sliding portion 301b. The brake fluid in the space between the front end of the pressing portion 301c and the M/C piston 311 which is formed by the gap S can flow via the communication path 301f.

While the cylinder portion 302 is ensuring the seal between the outer circumferential surface of the sliding portion 301b and an inner peripheral surface of the cylinder portion 302 by the seal members 301d and 301e, the input piston 301 slides in an axial direction. The cylinder portion 302 is provided with the opening 302a into which the pressure receiving portion 301a is inserted, a communication path 302b configured to be communicated with a master reservoir 32 maintained at atmospheric pressure, and a communication path 302c configured to be communicated with a hydraulic circuit which is configured by first to third control valves 6a to 6c and first and second pumps 7a and 7b. The inner peripheral surface of the opening 302a is provided with a seal member 302d to seal an opened portion between the opening 302a of the cylinder portion 302 and the outer circumferential surface of the pressure receiving portion 301a.

The input part 30 is configured by the above configuration. In the input part 30 including the above configuration, as the input piston 301 is disposed in the cylinder portion 302, a reaction force chamber 303, which is compressed or expanded in response to the operation of the brake pedal 2, is formed in the cylinder portion 302 at the side of the output part 31 than the sliding portion 301b. The reaction force chamber 303 is connected with the hydraulic circuit, which is configured by the first to third control valves 6a to 6c and the first and second pumps 7a and 7b, via the communication path 302c.

Also, a rear chamber 304 is formed by the outer circumference of the sliding portion 301b at the side of the brake pedal 2 than the seal member 301e in the cylinder portion 302 and a portion at the side of the brake pedal 2 than the sliding portion 301b. The rear chamber 304 is communicated with the space between the front end of the pressing portion 301c and the M/C piston 311, which is formed by the gap S, via the communication path 301f formed in the pressing portion 301c and the sliding portion 301b. As the input piston 301 is moved, a volume of the space between the front end of the pressing portion 301c and the M/C piston 311, which is formed by the gap S, and a volume of the rear chamber 304 are changed. However, an area, which is a difference between an inner diameter of the cylinder portion 302 and an outer diameter of the pressure receiving portion 301a, is configured to be identical to an area of the front end of the pressing portion 301e, so that changing amounts of the volumes is equal to each other. Accordingly, even when the input piston 301 is moved in any one of both directions in the axial direction in the cylinder portion 302, a reaction is not generated.

The communication path 302b is disposed at the side far away from the brake pedal 2 than the seal member 301d before the depression of the brake pedal 2 is performed. However, if the input piston 301 is moved by the depression of the brake pedal 2, the communication path 302b is immediately positioned at the side of the brake pedal 2 than the seal member 301d. After the brake pedal 2 is depressed, the inside of the reaction force chamber 303 and the master reservoir 32 are interrupted, and thus reaction hydraulic pressure, which is brake fluid pressure of the reaction force chamber 303, can be increased.

The output part 31 includes M/C pistons 311 and 312, a cylinder portion 313, and return springs 314 and 315.

The M/C pistons 311 and 312 are coaxially disposed in the cylinder portion 313 so that the M/C piston 311 serves as a primary piston, and the M/C piston 312 serves as a secondary piston, in which the M/C piston 311 becomes the input piston 301 side, as compared to the M/C piston 312. The M/C pistons 311 and 312 are formed in a cylinder having a bottom, and are disposed in the cylinder portion 313 in such a way that bottom portions 311a and 312a face the input piston 301. Accordingly, a driving hydraulic pressure chamber 316 is formed, in which the brake fluid is supplied or discharged between the bottom of the M/C piston 311 and one end portion of the cylinder portion 313 to drive the M/C pistons 311 and 312. Also, a primary chamber 317 is formed between the M/C piston 311 and the M/C piston 312, and a secondary chamber 318 is formed between the M/C piston 312 and the other end of the cylinder portion 313.

The cylinder portion is formed in a hollow cylinder having both end surfaces 313a and 313b, and the M/C pistons 311 and 312 are accommodated in the hollow portion.

The outer circumferential wall of the cylinder portion 313 is provided with communication paths 313c to 313g. The communication paths 313c and 313d respectively communicate the master reservoir 32, which is maintained at the atmospheric pressure at an initial position in which the service brake is not operated, with the primary chamber 317 and the secondary chamber 318. If the M/C pistons 311 and 312 are moved from the initial position, the communication paths 313c and 313d are interrupted by the outer circumferential surfaces of the M/C pistons 311 and 312. The communication path 313e communicates the hydraulic circuit, which is configured by the first to third control valves 6a to 6c and the first and second pumps 7a and 7b, with the driving hydraulic pressure chamber 316. The communication paths 313f and 313g communicate the primary chamber 317 and the secondary chamber 318 with a first hydraulic pipeline system and a second hydraulic pipeline system of a brake fluid hydraulic circuit.

An inner diameter of the cylinder portion 313 is enlarged at a bottom side of the M/C piston 311. Also, a projection 313h protrudes from one end surface 313a of the cylinder portion 313 toward the M/C piston 311. Accordingly, a gap is formed between the one end surface 313a of the cylinder portion 313 and the bottom of the M/C piston 311. The driving hydraulic pressure chamber 316 is configured by the inner-diameter enlarged portion of the cylinder portion 313 and the gap between the one end surface 313a of the cylinder portion 313 and the bottom of the M/C piston 311.

Although the cylinder portion 313 is illustrated as a single member in the drawing, it is configured by integrally assembling plural components.

The return springs 314 and 315 are disposed between the M/C piston 311 and the M/C piston 312, and between the M/C piston 312 and the other end surface 313b of the cylinder portion 313, respectively. When the M/C piston 312 is urged to a left side in the drawing, the return springs 314 and 315 serve to generate the reaction force and to return the M/C pistons 311 and 312 toward the input piston 301 in the case where the service brake is not operated.

The output part 31 is configured by the above configuration, the input part 30 and the output part 31 are integrated by connecting the front ends of two cylinder portions 302 and 313, more specifically, by inserting the projection 313h formed on the one end surface 313a of the cylinder portion 313 and an insertion portion 313i opposite to the one end surface into the cylinder portion 302, thereby configuring the M/C 3. The outer circumferential side of the insertion portion 313i is provided with a seal member 313j which is made of an O-ring or the like, thereby ensuring the sealability (sealing performance) with the cylinder portion 302. Also, the inner peripheral side of the insertion portion 313k is provided with a seal member 313k which is made of an O-ring or the like, thereby ensuring the sealability (sealing performance) with the reaction force chamber 303 and the bottom side of the M/C piston 311.

The W/Cs 4a to 4d are respectively communicated with the primary chamber 317 or the secondary chamber 318 via the brake fluid pressure control actuator 5. For example, in the case of front of rear pipeline, the W/Cs 4a and 4b of left and right front wheels FL and FR are connected with the primary chamber 317 via the first pipeline system, while the W/Cs 4c and 4d of left and right rear wheels RL and RR are connected with the secondary chamber 318 via the second pipeline system. If the brake fluid pressure (M/C pressure) of the same pressure is generated for the primary chamber 317 and the secondary chamber 318 of the M/C 3, it is fed to the respective W/Cs 4a to 4d via the brake fluid pressure control actuator 5 to generate the W/C pressure and thus generate a braking force for the respective wheels FL to RR.

The brake fluid pressure control actuator 5 configures the brake fluid pressure circuit for adjusting the W/C pressure. More specifically, the brake fluid pressure control actuator 5 includes several pipelines for performing brake fluid pressure control made in a metal housing to connect various electromagnetic valves and the pipeline formed in the pump housing, and a motor, for driving the pump, fixed to the housing, thereby configuring the brake fluid pressure circuit between the M/C 3 and the W/Cs 4a to 4d. The brake ECU 9 drives various electromagnetic valves, and drives the motor to operate the pump, thereby controlling the brake fluid pressure of the brake fluid pressure circuit and thus adjust the W/C pressure. Since the structure of the brake fluid pressure control actuator 5 is known in the art, its detailed description will be omitted herein.

The first to third control valves 6a to 6c correspond to a reaction force control valve, a driving liquid pressure control valve, and a valve unit of this disclosure, respectively. The first and second control valves 6a and 6b are adapted as a normally-opened type, while the third control valve 6c is adapted as a normally closed type. The first and second pumps 7a and 7b configure a reaction force pump and a driving pump, respectively, and perform suction and discharge operation of the brake fluid based on the drive of the first and second motors 8a and 8b. Among these, a reaction force generating unit is configured by the first control valve 6a, the first pump 7a and the first motor 8a to compress or expand the reaction force chamber 303 in response to the operation of the brake pedal 2, thereby generating a reaction hydraulic pressure in accordance with the operation amount of the brake pedal 2. Also, an electrical pressure adjusting unit is configured by the second control valve 6b, the second pump 7b and the second motor 8b to supply the driving hydraulic pressure chamber 316 with the brake fluid or discharge the brake fluid from the driving hydraulic pressure chamber 316, thereby adjusting the driving hydraulic pressure in the driving hydraulic pressure chamber 316.

Specifically, the first to third control valves 6a to 6c and the first and second pumps 7 configure the hydraulic circuit provided between the reaction force chamber 303 in the input unit 30 and the driving hydraulic pressure chamber 316 in the output unit 31. The reaction force chamber 303 is connected with the driving hydraulic pressure chamber 316 via the pipeline A, and the first and second normally-opened electromagnetic valves 6a and 6b are provided in the pipeline A. The first and second control valves 6a and 6b in the pipeline A are connected with an atmospheric reservoir 10 via the pipeline B, and the third normally-closed control valve 6c is provided in the pipeline B. The reaction force chamber 303 in the pipeline A is connected with the first control valve 6a via a pipeline C1, and the driving hydraulic pressure chamber 316 in the pipeline A is connected with the second control valve 6b via a pipeline C2. The atmospheric reservoir 10 is connected with the pipelines C1 and C2 via a pipeline D, and connection points between the pipeline D and the pipelines C1 and C2 are provided with the first and second pumps 7a and 7b. The first and second control valves 6a and 6b are provided in parallel with check valves 11 at an outlet port of the respective pumps 7a and 7b to not feed the brake fluid from the driving hydraulic pressure chamber 316 to the reaction force chamber 303 or the atmospheric reservoir 10 and to not apply a high pressure to the outlet ports of the first and second pumps 7a and 7b.

Also, in this illustrative embodiment, the pipeline A corresponds to an inter-chamber brake fluid path, and the pipeline B corresponds to a reservoir path.

In the pipeline C1 or the pipeline A, a first pressure sensor 12 is provided at a portion of the reaction force chamber 303 than the first control valve 6a. In the pipeline C2 or the pipeline A, a second pressure sensor 13 is provided at a portion of the driving hydraulic pressure chamber 316 than the second control valve 6b. The reaction hydraulic pressure in the reaction force chamber 303 and the driving hydraulic pressure in the driving hydraulic pressure chamber 316 are monitored by the first and second pressure sensors 12 and 13, and the detected signal is input to the brake ECU 9. Based on the reaction hydraulic pressure in the reaction force chamber 303 and the driving hydraulic pressure in the driving hydraulic pressure chamber 316, the brake ECU 9 controls the first to third control valves 6a to 6c, and drives the first and second motors 8a and 8b to operate the first and second pumps 7a and 7b. The brake ECU 9 performs the generation of the reaction force against the depression of the brake pedal 2 or the adjustment of the M/C pressure at the time of regenerative braking.

As described above, the braking device 1 according to this illustrative embodiment is configured. Next, the operation of the braking device 1 having the above configuration will be described, considering a normal time and an abnormal time (power supply failure).

1. Normal Operation

At the normal time, that is, when the brake ECU 9 is not out of order and thus successfully drives the first to third control valves 6a to 6c and the first and second motors 8a and 8b, the operation amount of the brake pedal 2 is monitored in accordance with the detected signal of the operation amount sensor 21 and the first and second pressure sensors 12 and 13, and the brake pressure of the reaction force chamber 303 and the driving hydraulic pressure chamber 316 is monitored. Then, it can perform a regenerative cooperative control and generate the maximum regenerative brake to be generated until the operation amount of the brake pedal 2 reaches some degrees.

First, the first motor 8a is driven to operate the first pump 7a, and the third control valve 6c is switched to the communication state. A conduction amount of the first control valve 6a to the solenoid is controlled to linearly control an amount of pressure difference between the atmospheric reservoir 10 and the reaction force chamber 303 in the pipeline A with interposing the first control valve 6a. Accordingly, the brake fluid is introduced into the reaction force chamber 303 by the suction/discharge operation of the first pump 7a and the pressure difference formed by the first control valve 6a, so that the reaction hydraulic pressure of the reaction force chamber 303 is increased and the pedal reaction force is imparted to the brake pedal 2 through the input piston 301. At this tune, based on the result monitored by the operation amount sensor 21 and the first pressure sensor 12, the first control valve adjusts the amount of pressure difference to generate the pedal reaction force corresponding to the operation amount of the brake pedal 2, thereby adjusting the reaction pressure of the reaction force chamber 303.

With respect to the second control valve 6b, it may be preferable to interrupt the reaction force chamber 303 and the driving hydraulic pressure chamber 316 as the interruption state, and but the reaction force chamber 303 and the driving hydraulic pressure chamber 316 are maintained in the communication state without being controlled. At this time, since the driving hydraulic pressure chamber 316 is communicated with the atmospheric reservoir 10 to not generate the brake fluid pressure, the M/C pressure is not generated until the front end of the pressing portion 301c of the input piston 301 comes into contact with the M/C piston 311 in response to the depression of the brake pedal 2.

Accordingly, in the regenerative cooperative control, the input piston 301 does not come into contact with the M/C piston 311, which is the output piston, until the maximum regenerative brake is generated, so that the maximum regenerative efficiency is to be achieved.

After that, if the operation amount of the brake pedal 2 is increased and then reaches the maximum amount to generate the regenerative brake, the second motor 8b is driven to operate the second pump 7b. As the second control valve 6b controls the conduction amount of the solenoid, the amount of pressure difference between the driving hydraulic pressure chamber 316 and the atmospheric reservoir 10 is linearly controlled in the pipeline A with interposing the second control valve 6b. Accordingly, the pressure difference formed by the suction/discharge operation of the second pump 7b and the second control valve 6b introduces the brake fluid to the directly connected driving hydraulic pressure chamber 316, without introducing a pressure circuit element, which is an orifice of the electromagnetic valve or the like, in the second pump 7b. Also, the driving hydraulic pressure which is the brake fluid pressure of the driving hydraulic pressure chamber 316 is increased, and the M/C pistons 311 and 312 are pressed to the left side of the drawing paper to generate the M/C pressure. Based on the monitor result of the operation amount sensor 21 and the second pressure sensor 13, the second motor 8b is controlled to adjust the driving hydraulic pressure of the driving hydraulic pressure chamber 316. Accordingly, a part of the braking force generated in response of the operation amount of the brake pedal 2 can be generated, except for an amount corresponding to the regenerative brake.

When the M/C pressure is generated by the above way, it is sent to the respective W/Cs 4a to 4d via the brake fluid pressure control actuator 5. As a result, an intended braking force can be generated. Since the above configuration includes the first and second pumps 7a and 7b and the first and second pumps 8a and 8b, the reaction hydraulic pressure control of the reaction force chamber 303 and the driving hydraulic pressure control in the driving hydraulic pressure chamber 316 can be separately carried out by different systems. Accordingly, the reaction hydraulic pressure of the reaction force chamber 303 and the driving hydraulic pressure of the driving hydraulic pressure chamber 316 can be independently controlled, and the optimum brake hydraulic pressure can be controlled. That is, since the first and second control valves 6a and 6b are independently controlled, the reaction hydraulic pressure of the reaction force chamber 303 and the driving hydraulic pressure of the driving hydraulic pressure chamber 316 can be independently controlled, so that the optimum brake fluid pressure can be controlled without mutually interfering in the respective systems. Since the reaction hydraulic pressure of the reaction force chamber 303 can be set as the pressure according to the drive of the first motor 8a, a reaction force characteristic can be flexibly adjusted in accordance with a state and kind of a vehicle to be imparted with the reaction force in accordance with the drive of the motor.

2. Operation at Time of Power Supply Failure

At the time of power supply failure, that is, when the brake ECU 9 or the like is out of order and thus the first to third control valves 6a to 6c and the first and second motors 8a and 8b are normally driven, the first to third control valves 6a to 6c are maintained at the illustrated positions.

When the brake pedal 2 is depressed in this state, the input piston 301 is moved to the left side in the drawing, so that the brake fluid of the reaction force chamber 303 flows to the driving hydraulic pressure chamber 316 via the pipeline A. That is, both of the first and second control valves 6a and 6b are communicated with each other, and the third control valve 6c is interrupted. Therefore, a corresponding amount of the brake fluid extruded from the reaction force chamber 303 is introduced to the driving hydraulic pressure chamber 316.

The M/C pistons 311 and 312 are pressed to the left side in the drawing by the driving hydraulic pressure of the driving hydraulic pressure chamber 316, thereby generating the M/C pressure. Accordingly, when the M/C pressure is generated, it is sent to the respective W/Cs 4a to 4d via the brake fluid pressure control actuator 5. Accordingly, the intended braking force can be generated. Accordingly, it is possible to generate the braking force before the input piston 301 comes into contact with the M/C piston 311 which is the output piston at the time of the power supply failure. Also, even when the gap S is provided between the input piston 301 and the M/C piston 311, an ineffective stroke can be eliminated.

As described above, according to the braking device 1 of this illustrative embodiment, the M/C 3 includes the reaction force chamber 303 for changing the reaction hydraulic pressure in response to the movement of the input piston 301, and the driving hydraulic pressure chamber 316 connected with the reaction force chamber 303 via the hydraulic pressure circuit. The hydraulic pressure circuit includes the first to third control valves 6a to 6c and the first and second pumps 7a and 7b. The reaction force generating unit for generating the reaction hydraulic pressure or the electrical pressure adjusting unit for adjusting the driving hydraulic pressure of the driving hydraulic pressure chamber 316 is provided in the reaction force chamber 303. The first and second control valves 6a and 6b are the normally-closed electromagnetic valve which is the communication state in time of non-conduction. The first and second control valves 6a and 6b are configured by a proportional control valve capable of adjusting an amount of pressure difference in accordance with the amount of current to be conducted, but may be a simple open/close valve.

According to the above braking device, when the regenerative cooperative control is performed at the normal time, it is possible to obtain the maximum regenerative efficiency to not generate the M/C pressure until the maximum regenerative brake, which can control the driving hydraulic pressure generated in the driving hydraulic pressure chamber 316 by the first and third control valves 6a to 6c and control and generate the reaction hydraulic pressure generated in the reaction force chamber 303, is generated. Also, at the time of the power supply failure, since the first and second control valves 6a and 6b are the normally-opened type, the pipeline A configuring the inter-chamber brake fluid path is in the communication state. If the brake fluid of the reaction force chamber 303 flows to the driving hydraulic pressure chamber 316 via the pipeline A, the braking force can be generated in accordance with the operation amount of the brake operating member, without having the ineffective stroke. Accordingly, it is possible to prevent ineffective input at the time of the power supply failure, while ensuring the regenerative efficiency.

When the driving hydraulic pressure is generated in the driving hydraulic pressure chamber 316, any control valve is not provided in the pass from the second pump 7b to the driving hydraulic pressure chamber 316. Accordingly, as compared to the case where the brake fluid flows through the control valve, since the brake fluid does not need to pass the orifice existing in the pressure circuit element, the responsiveness can be improved.

The reaction hydraulic pressure of the reaction force chamber 303 and the driving hydraulic pressure of the driving hydraulic pressure chamber 316 can be controlled by the first and second normally-opened electromagnetic valves 6a and 6b. Accordingly, since it is not necessary to control the hydraulic pressure against the strong spring force, like the case of controlling it by the normally-closed control valve, it is possible to decrease current consumption.

The pipeline B which is the reservoir path is connected with the pipeline A which is the brake fluid path, and a portion of the pipeline A between the driving hydraulic pressure chamber 316 and the pipeline B serves as a discharge path of the brake fluid to the atmospheric reservoir 10. Also, a portion of the pipeline A between the connection portion with the second pump 7b and the driving hydraulic pressure chamber 316 serves as a supply path for supplying the brake fluid to the driving hydraulic pressure chamber 316 from the second pump 7b. Similarly, a portion of the pipeline A between the connection portion with the first pump 7a and the reaction force chamber 303 serves as a supply path for supplying the brake fluid to the reaction force chamber 303 from the first pump 7a. The pipeline A made in common with the path of the brake fluid includes the first control valve 6a and the second control valve 6b, or the pipeline B includes the third control valve 6c. Accordingly, various paths or the communization of the third control valve 6c, that is, the configuration including the entire reaction force generating unit and the electrical pressure adjusting unit can be used, thereby simplifying the circuit configuration and reducing the size of the braking device and its cost.

Illustrative Embodiment 2

The second illustrative embodiment of this disclosure will be described. This illustrative embodiment is substantially identical to the first illustrative embodiment, except for the configuration of the control valve provided in the hydraulic circuit of the first illustrative embodiment. Therefore, only the portion different from the first illustrative embodiment will be described below.

Figure 2:
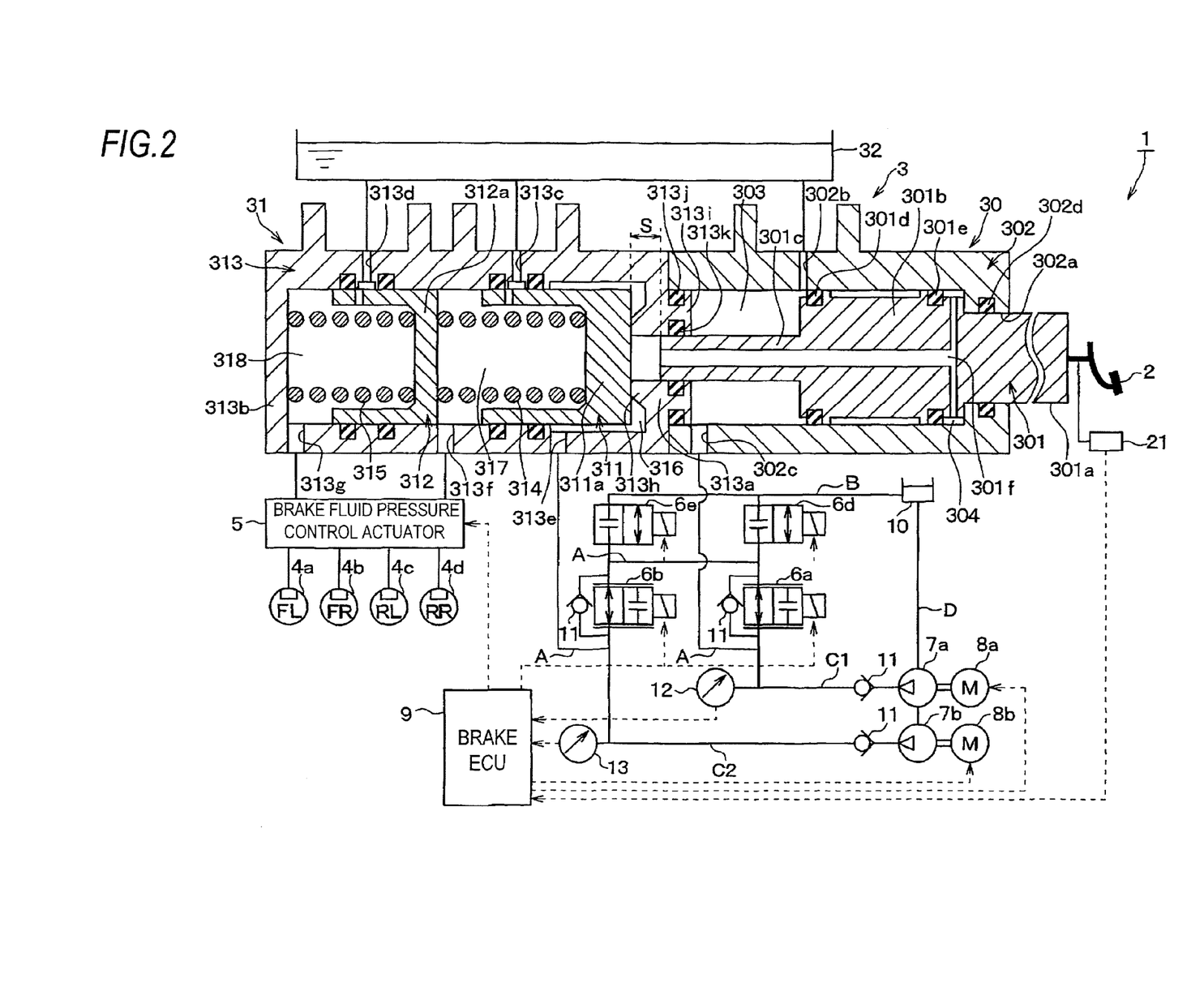
FIG. 2 is a schematic circuit diagram illustrating the whole configuration of the braking device for the vehicle according to a second illustrative embodiment of this disclosure.

FIG. 2 is a schematic circuit diagram illustrating the whole configuration of the braking device 1 for the vehicle according to this illustrative embodiment. As illustrated in FIG. 2, this illustrative embodiment includes first to second control valves 6a, 6b, 6d and 6e. Among them, the first and second control valves 6a and 6b have the same role as that of the first illustrative embodiment, but the third and fourth control valves 6d and 6e serves as the third control valve 6c of the first illustrative embodiment. More specifically, the third control valve 6d is provided between the first control valve 6a and the reservoir 10, and the fourth control valve 6e is provided between the second control valve 6b and the reservoir 10. That is, the pipeline connecting the first and second control valves 6a and 6b of the pipeline A with the reservoir 10 is divided into two parts which are connected with each other in parallel, and the third and fourth valves 6d and 6e are respectively provided in the pipeline B which is divided into two parts.

If the third and fourth control valves 6d and 6e are provided as described above, even when one of two control valves is out of control due to biting of a foreign material, the control can be achieved by the other which is normal.

In the case of this illustrative embodiment, the reaction force generating unit is configured by the first control valve 6a, the first pump 7a, and the first motor 8a. The electrical pressure adjusting unit is configured by the second control valve 6*b*, the second pump 7*b* and the second motor 8*b*. The valve unit is configured by the third control valve 6*d* and the fourth control valve 6*e*.

Illustrative Embodiment 3

The third illustrative embodiment of this disclosure will now be described. This illustrative embodiment is substantially identical to the first illustrative embodiment, except that the pedal reaction force is generated by a stroke simulator. Therefore, only the portion different from the first illustrative embodiment will be described herein.

Figure 3:
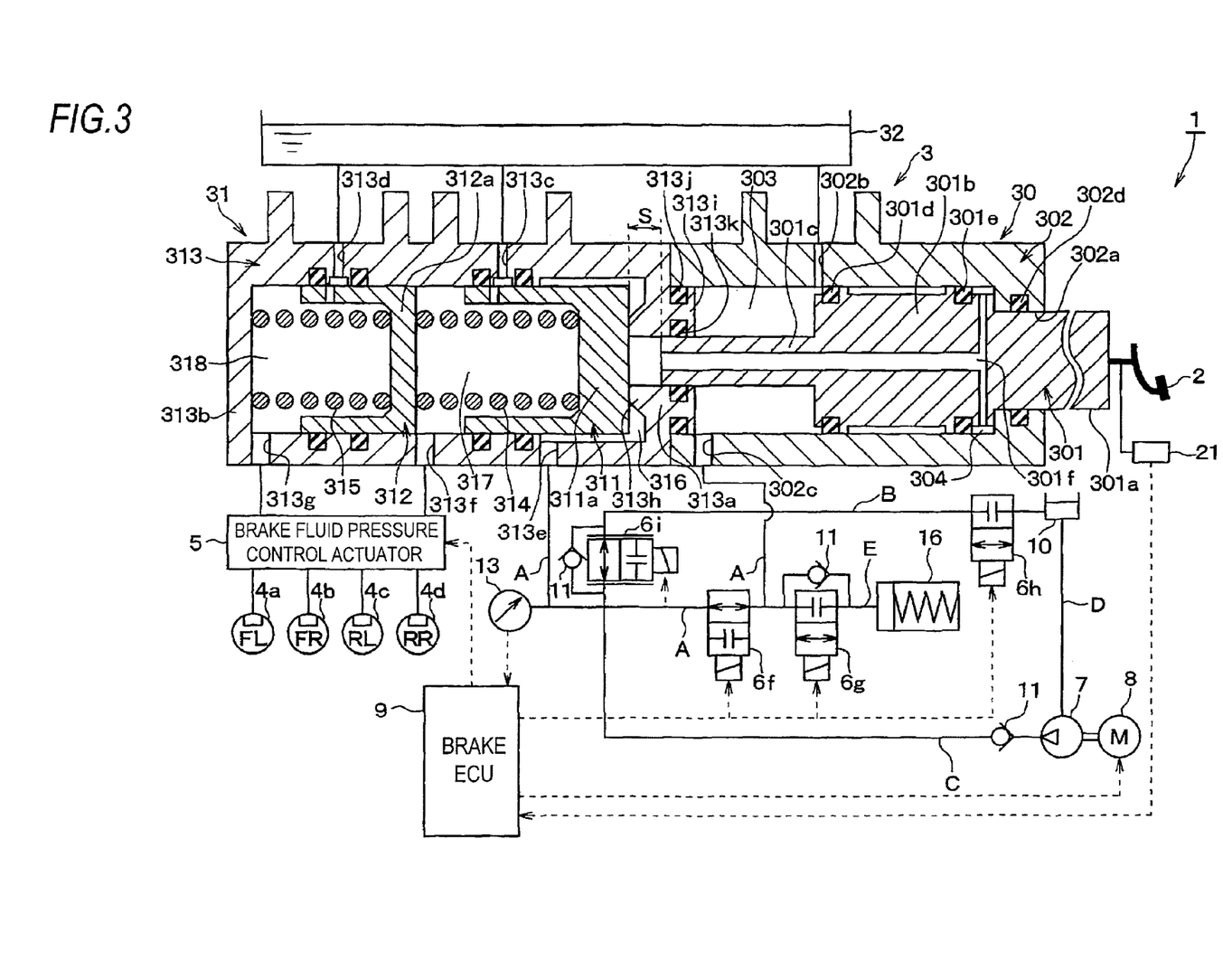
FIG. 3 is a schematic circuit diagram illustrating the whole configuration of the braking device for the vehicle according to a third illustrative embodiment of this disclosure.

FIG. 3 is a schematic circuit diagram illustrating the whole configuration of the braking device 1 for the vehicle according to the third illustrative embodiment of this disclosure. As illustrated in FIG. 3, the first pump 7*a* and the first motor 8*a* configuring a part of the reaction force generating unit provided in the first illustrative embodiment are eliminated in this illustrative embodiment, and the reaction force generating unit is configured by the first and second control valves 6*f* and 6*g* and a stroke simulator 16. Only a first normally-opened electromagnetic valve 6*f* is disposed in the pipeline A. The reaction force chamber 303 and the first control valve 6*f* in the pipeline A are connected by a pipeline E. A second normally-closed control valve 6*g* is disposed in the pipeline E. The communication interrupting state, between the path connecting the MC/3 and the stroke simulator 16, and the driving hydraulic pressure chamber 316 is controlled by the first control valve 6*f*, and the communication interrupting state between the reaction force chamber 303 and the stroke simulator 16 is controlled by the second control valve 6*g*.

The pipeline B connected with the atmospheric reservoir 10 is connected between the driving hydraulic pressure chamber 316 and the first control valve 6*f* in the pipeline A, and the pipeline B includes a third normally-closed control valve 6*h* and a fourth normally-opened electromagnetic valve 6*i*. The third control valve 6*h* configures the valve unit and controls the driving hydraulic pressure chamber 316 and the atmospheric reservoir 10 as the communication state in time of conduction, or as the interruption state in time of non-conduction. The fourth control valve 6*i* is configured by a proportional control valve capable of adjusting the amount of pressure difference between the driving hydraulic pressure chamber 316 and the atmospheric reservoir 10 in accordance with the amount of current in the solenoid, thereby controlling the amount of pressure difference. The fourth control valve controls the flow of the brake fluid from the driving hydraulic pressure chamber 316 to the atmospheric reservoir 10 and adjusts the driving pressure of the driving hydraulic pressure chamber 316. Herein, the fourth control valve 6*i* is configured by the proportional control valve, but may be a simple open/close valve.

The pipeline C is connected between the driving hydraulic pressure chamber 316 and the first control valve 6*f* in the pipeline A, and the brake fluid is generated in the driving hydraulic pressure chamber 316 via the pipeline C on the basis of the supply of the brake fluid from the atmospheric reservoir 10 via the pipeline D, and the pump 7 and the motor 8 corresponding to the second pump 7*b* and the second motor 8*b* in the first illustrative embodiment. That is, the electrical pressure adjusting unit is configured by the third and fourth control valves 6*h* and 6*i*, the pump 7 and the motor 8.

With the braking device 1 including the above configuration, when the first control valve 6*f* is shifted to the interruption state in the normal state, even when the input piston 301 is moved in response to the depression of the brake pedal 2, the M/C pistons 311 and 312 are not moved. Simultaneously, the second control valve 6*g* is shifted to the communication state by the conduction, and the reaction force chamber 303 is communicated with the stroke simulator 16. The reaction hydraulic pressure generated in the reaction force chamber 303 becomes the pressure set by the stroke simulator 16, and the pedal reaction force is imparted in accordance with the operation amount of the brake pedal 2.

After that, if the operating amount of the brake pedal 2 is increased and then reaches the maximum amount which can be generated and obtained by the regenerative brake, the motor 8 is driven to operate the pump 7. Also, the amount of pressure difference of the fourth control valve 6*i* is linearly driven, and the third control valve 6*h* is shifted to the communication state. Accordingly, the intended driving hydraulic pressure can be generated in the driving hydraulic pressure chamber 316.

The first to fourth valves 6*f* to 6*i* are maintained at all illustrated positions at the power supply failure. Accordingly, the reaction force chamber 303 and the driving hydraulic pressure chamber 316 are communicated with each other via the first control valve 6*a* which is communicated with the pipeline A. As well as the first illustrative embodiment, when the brake pedal 2 is depressed, the brake fluid is moved from the reaction force chamber 303 to the driving hydraulic pressure chamber 316 via the pipeline A, so that the M/C pressure can be generated by the driving hydraulic pressure of the driving hydraulic pressure chamber 316.

The stroke simulator 16 can be configured to generate the reaction hydraulic pressure in accordance with the operation amount of the brake pedal 2. The effect similar to that of the first illustrative embodiment can be obtained even by the configuration. Also, the reaction force generating unit can be configured by the above configuration, without using the motor and the pump, so that the circuit configuration can be simplified.

OTHER ILLUSTRATIVE EMBODIMENTS

The respective illustrative embodiments has been described about the case where the atmospheric reservoir 10 has the configuration different from the master reservoir 32, but the master reservoir 32 may be used as the atmospheric reservoir 10.

The third illustrative embodiment includes two control valves, that is, the third and fourth valves 6*h* and 6*i*, in the pipeline B. However, since the motor 8 is controlled to adjust the driving hydraulic pressure of the driving hydraulic pressure chamber 316, only the third normally-closed control valve 6*h* may be provided.

In addition, in the respective illustrative embodiments, various paths of this disclosure are configured by the pipelines A to E provided in the hydraulic circuit. Specifically, among the respective pipelines A to E, the pipeline A connecting the reaction force chamber 303 and the driving hydraulic pressure chamber 316 corresponds to the inter-chamber brake fluid path, the pipeline B connecting the atmospheric reservoir 10 and the inter-chamber brake fluid path corresponds to the reservoir path, and the path C connecting the stroke simulator 16 and the inter-chamber brake fluid path corresponds to the simulator path.

What is claimed is:
1. A braking device comprising:
a master cylinder, which forms a driving hydraulic pressure chamber, in which a brake fluid is supplied to or discharged from the driving hydraulic pressure chamber to drive a master piston;

an electrical pressure adjusting unit, which adjusts hydraulic pressure of the driving hydraulic pressure chamber by supplying the brake fluid to the driving hydraulic pressure chamber or discharging the brake fluid from the driving hydraulic pressure chamber;

a reaction force generating unit, which forms a reaction force chamber that is compressed or expanded in accordance with operations of a brake operating member, and which generate a reaction hydraulic pressure in the reaction force chamber in accordance with an operation amount of the brake operating member;

a reservoir for brake fluid;

an inter-chamber brake fluid path that connects the reaction force chamber and the driving hydraulic pressure chamber;

a reservoir path that connects the reservoir and the inter-chamber brake fluid path;

a normally-closed control valve, which is provided in the reservoir path;

a plurality of electromagnetic valves, each of which is provided in one of the electrical pressure adjusting unit and the reaction force generating unit;

wherein the electrical pressure adjusting unit includes an electrical pump which is directly connected with the driving hydraulic pressure chamber to supply the brake fluid to the driving hydraulic pressure chamber;

at least one of the plurality of electromagnetic valves is provided in the inter-chamber brake fluid path and is normally-open; and the reaction force generating unit includes i) a reaction force pump connected with the reaction force chamber to supply the brake fluid to the reaction force chamber, and ii) a reaction pressure control valve provided at a portion between a connection portion with the reservoir path and the reaction force chamber in the inter-chamber brake fluid path, the reaction pressure control valve being the at least one of the plurality of electromagnetic valves or an other one of the plurality of electromagnetic valves.

2. The braking device according to claim 1, wherein the electrical pressure adjusting unit includes a driving hydraulic pressure control valve provided at a portion between the connection portion with the reservoir path and the driving hydraulic pressure chamber in the inter-chamber brake fluid path, the driving hydraulic pressure control valve being the at least one of the plurality of electromagnetic valves or the other one of the plurality of electromagnetic valves.

3. The braking device according to claim 2, wherein the electrical pump is connected with a portion between the driving hydraulic pressure chamber and the driving hydraulic pressure control valve in the inter-chamber brake fluid path.

4. The braking device according to claim 1, wherein the reaction force pump is connected with a portion between the reaction force chamber and the reaction pressure control valve in the inter-chamber brake fluid path.

* * * * *